United States Patent [19]

Zarrelli et al.

[11] 4,370,969
[45] Feb. 1, 1983

[54] PROPANE AUTOMOTIVE FEED SYSTEM

[75] Inventors: Neal Zarrelli, 200 Central Park S., New York, N.Y. 10017; Joseph V. Bocassi; Robert S. Miller, both of Garnerville, N.Y.

[73] Assignee: Neal Zarrelli, New York, N.Y.

[21] Appl. No.: 248,323

[22] Filed: Mar. 27, 1981

[51] Int. Cl.³ ................... F02M 21/02; F02M 29/00
[52] U.S. Cl. .................................. 123/525; 123/590; 123/577; 48/180 R
[58] Field of Search ............... 123/590, 577, 525–527; 261/79 R; 48/180 R

[56] References Cited

U.S. PATENT DOCUMENTS

| | | | |
|---|---|---|---|
| 2,701,133 | 2/1955 | Méndez | 123/525 |
| 2,831,756 | 4/1958 | Miles et al. | 123/526 |
| 2,896,658 | 7/1959 | Jones | 123/527 |
| 2,939,775 | 6/1960 | Middleton et al. | 48/180 R |
| 2,983,592 | 5/1961 | Jones | 48/180 R |
| 3,049,415 | 8/1962 | Hansen | 48/180 R |
| 3,081,160 | 3/1963 | Ensign | 48/180 R |
| 4,063,905 | 12/1972 | Johnson et al. | 48/180 R |

Primary Examiner—Charles J. Myhre
Assistant Examiner—E. Rollins Cross
Attorney, Agent, or Firm—Marvin Feldman; Stephen E. Feldman; Jules L. Chaboty

[57] ABSTRACT

A propane gas feed device and system are provided wherein controlled, measured quantities of propane gas are controllably pre-mixed with air and this pre-mixture of air-propane is fed as a carburetor mixture for combustion in the engine. An air cut-off screen is controllably operated to adjust the air-fuel ratio relative to a changeover in the propane and gasoline demands. The propane feed system may be retro-fitted to an automobile employing conventional propane feed and provides for more efficient use of the propane with reduced unburned fraction in the engine exhaust. The propane air-feed device is also useful as wherein propane is the sole fuel.

19 Claims, 4 Drawing Figures

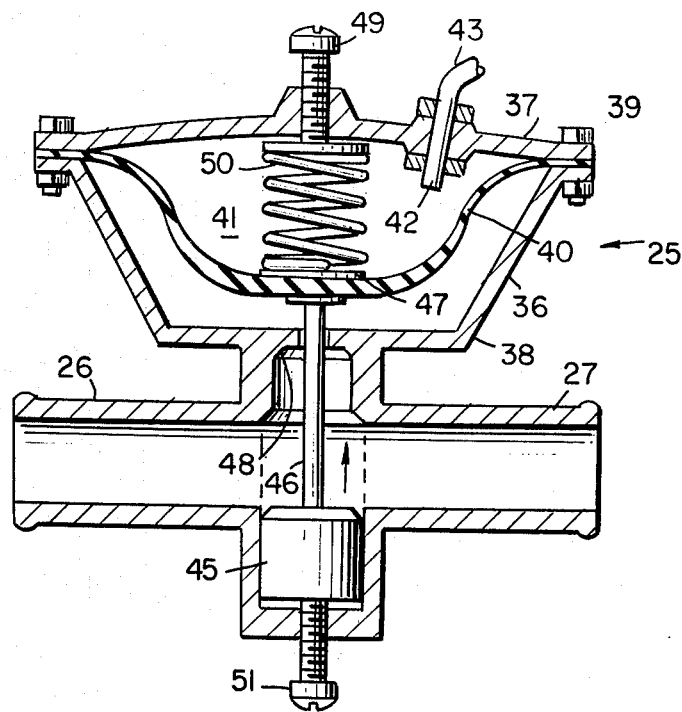
FIG. 2
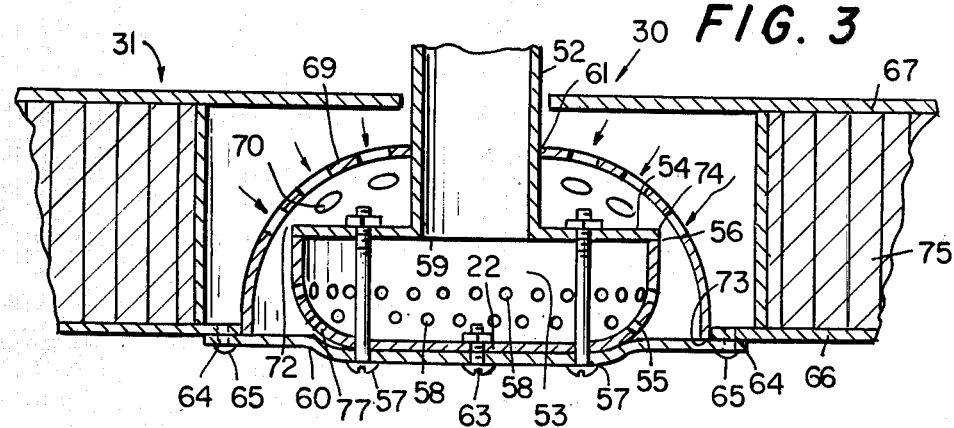
FIG. 3
FIG. 4

PROPANE AUTOMOTIVE FEED SYSTEM

FIELD OF THE INVENTION

This invention relates to a fuel gas device for use in an internal combustion engine. Specifically this invention relates to a propane fuel control system for automotive internal combustion engines.

BACKGROUND AND DISCUSSION OF PRIOR ART

Heretofore it was known in the automotive field to utilize propane gas or liquid petroleum gas as an alternative to gasoline use in order to provide better economy. Propane tanks and propane vaporizer-reducers in combination with gasoline lock-off valves have been installed in automobiles and trucks, so that in gasoline inefficient use situations, the gasoline is discontinued, and propane gas fed to the carburetor to reduce operating costs.

In U.S. Pat. No. 4,068,639, to Cook, it was disclosed to employ a regulated propane valve to feed propane gas through complex piping and controls to different demand sections of the carburetor.

In U.S. Pat. No. 4,078,532 to Smith, an apertured plate was disposed in conventional gasoline carburetor to assist in vaporizing droplets for better gasoline-air mixing.

While such prior art techniques saved gasoline consumption, in those systems which sought to utilize propane, the propane utilization was often inefficient and unburned propane would be found in the exhaust gases.

Now there is provided by the present invention a device to control the propane utilization in an internal combustion engine.

It is therefore a principal object of the present invention to provide improved propane utilization in an internal combustion engine.

It is another object of the present invention to provide a device which controls the propane consumption in combination and cooperation with the gasoline consumption in a vehicle internal combustion engine.

It is still another object to provide a device as aforesaid which reduces, if not eliminates, the unburned propane gas in the vehicle exhaust.

It is still another object of present invention to provide a propane feed device which is readily installed in a vehicle as either the sole fuel or as a secondary fuel feed device.

It is still another object of present invention to provide a device which is of practical and relatively inexpensive design and manufacture, which can be readily retro-fitted in vehicles employing conventional fuel feed systems, and yet is safe and practical in use.

DESCRIPTION OF THE DRAWINGS

FIG. 2 is an enlarged sectional view of the propane regulator valve taken along line 2—2 of FIG. 1; and FIG. 3 is an enlarged sectional view of the propane carburetor mixer; and FIG. 4 is an enlarged sectional and partial schematic view of the air cut-off device of the present invention.

DESCRIPTION OF THE PREFERRED EMBODIMENTS

Figure 1:
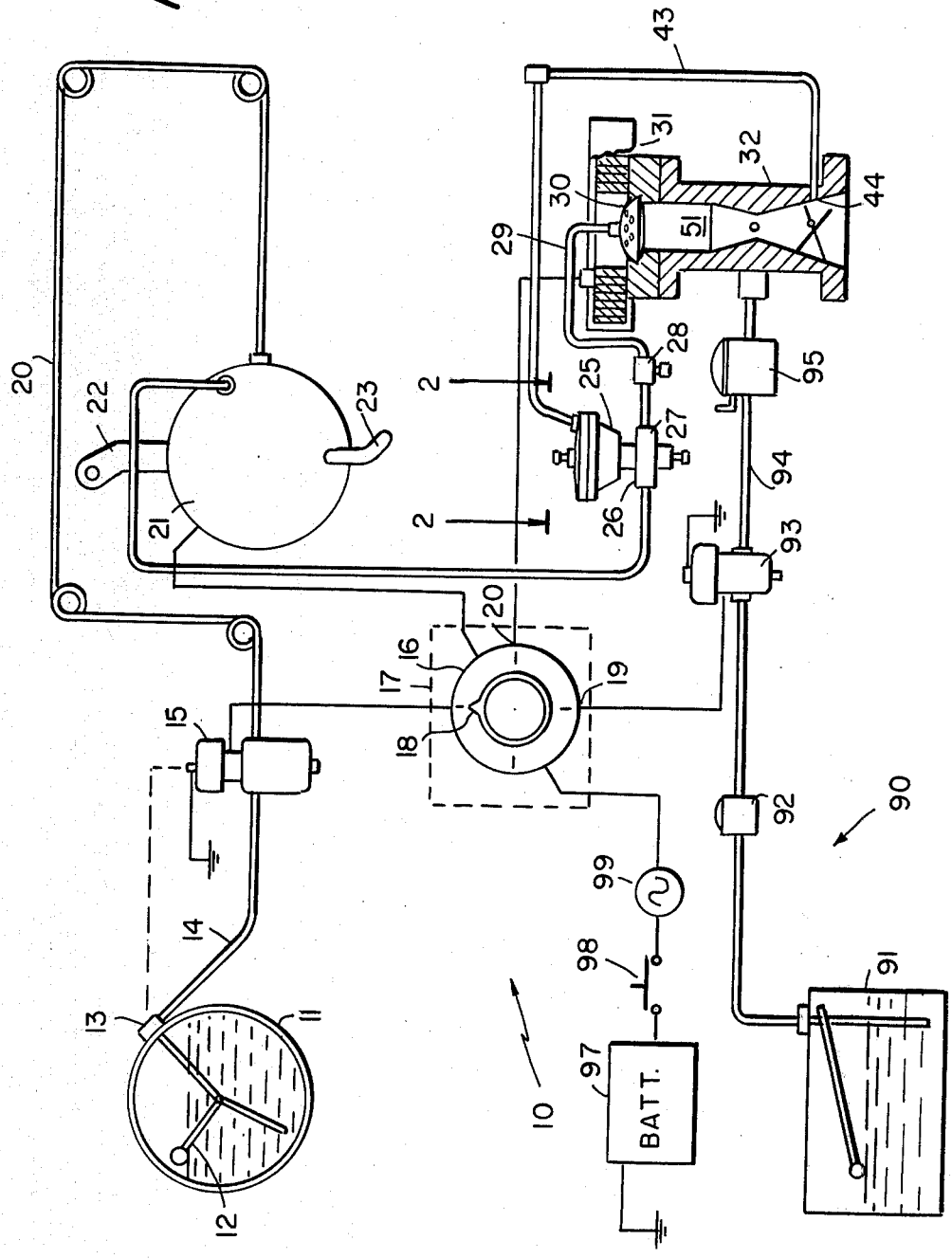
FIG. 1 is a schematic view of the system of the present invention installed in a vehicle.

Referring to FIG. 1, there is shown the propane feed system of the present invention generally referred to as number 10. System 10 comprises a liquid propane feed tank 11 containing a float feed 12 and supply valve 13 to feed liquid propane through conduit 14 to electromagnetic cut-off valve 15, which is actuated by manually operable commutator switch 16, which is dashboard mounted 17, for reasons more fully explained hereinafter.

Switch 16 is a multiple position switch, and in position 18 shown in FIG. 1, the operator selects propane use as opposed to gasoline use. Switch position 19 indicates gasoline use. Valve 13 is electrically interconnected to valve 15, so that with selection at position 18 both valves are actuated for propane use. Liquid propane from valve 15 is fed through conduit 20 to a vaporized unit 21, whereat the liquid propane is heated by hot water from the automobile water circulation system (not shown) through inlet and outlet valves 22 and 23 respectively. A typical vaporizer which may be employed in the present invention is the Bedini unit, manufactured by R. Bedini, Melano, Italy. However, it is to be borne in mind that the Bedini unit contains an integrally constructed gas pressure reduction valve which is not necessary pursuant to the present invention.

Propane gas is fed from vaporizer 21 through conduit 24 to propane gas control valve 25. Gas enters valve 25 at inlet orifice 26 and the flow rate is automatically controlled by valve 25 operation, and the demanded amount exits through outlet 27 to a peak r.p.m. register 28, and through conduit 29, to the propane-air mixer 30 disposed within air filter assembly 31 for eventual feed to carburetor 32.

Referring specifically to FIG. 2, there is shown propane gas regulator or control valve 25 comprising body portion 36 formed with a top plate 37 and bottom section 38 interconnected by bolts 39 and having a flexible diaphragm 40 disposed between the plates so as to form chamber 41. Diaphragm 40 also served as a gasket. A regulator feed pipe 42 is sealably connected so as to be in fluid communication with chamber 41. Pipe 42 is connected through conduit 43 to the manifold 44, so that the pressure in the manifold is reflected in chamber 41, and in cooperation with spring 50, causes a concommitant expansion or retraction of diaphragm 40. A valve 45 and valve stem 46 are fixedly mounted to diaphragm 40 by plate 47 so that the expansion or contraction of the diaphragm causes a respective lowering or raising of the valve 45. When fully raised, valve 45 engages seat 48 and shuts off the flow of propane through conduits 26 and 27. An adjustment screw 49 and spring 50 adjustably control the setting of the valve position. This adjustment is done in cooperation with valve adjustment screw 51 disposed at the base of valve 45.

In this manner of construction when the manifold exhaust demand increases vacuum, the volume of gas in chamber 41 decreases with diaphragm 40 being pulled upward and raising valve 45 to close down propane passing through valve 25 to the carburetor 32. With increased demand and decreased vacuum, as when accelerating, the spring 50 forces expansion of diaphragm 40 and opening of the valve 45 to permit increased propane flow.

Propane gas from valve 25 is pre-mixed with air before entering the carburetor throat 51. It has been found that by providing a specialized design mixer 30, particularly in combination with control valve 25, the propane is economically and efficiently utilized.

Referring now specifically to FIG. 3, mixer 30 is shown in greater detail, and is shown to comprise an inlet conduit 52, communicating with body portion 53 which is formed of a top plate 54 and a dome-shaped plate 55, sealed at rim 56, and integrally held by screws 57. A plurality of holes 58 are formed in plate 55 and are radially spaced from the inlet conduit orifice 59. Bracket 60 extends across the bottom of plate 55 and is shaped to contour plate so that mixer 30 is nested within bracket 60. Bracket 60 and plate 55 are formed with respective coincident through holes 61 and 62 which receive mounting screw 63. Bracket 60 is also formed with mounting holes 64 for securing screws 65 so that the bracket is secured to bottom plate 66 of air filter housing 67. This permits bracket 60 and the integrally connected mixer 30 to be fixedly secured within the air filter assembly 31. Mixer 30 is also provided with a second dome-shaped plate 69 which is upwardly disposed whereas plate 55 is downwardly disposed. Plate 69 is formed with a second plurality of holes 70 which are radially disposed from central mounting hole 71. Plate 69 is slidably receiving by conduit 52 in hole 71 so that plate 69 is spaced frame plate 55 as at annular channel 72. The outward peripheral edge 73 of plate 69 extends beyond edge 74 of plate 55 and further extends to bottom plate 66 of the air filter housing 67. Second plate holes 70 are less in number than but greater in size than holes 78 to achieve the proper air-propane mixing.

In this manner of arrangement and construction, air passing air filter assembly 31, and specifically through annular-shaped filter 75 is directed over surface 76 of dome-plate 69 and through holes 70 and in turn, through annular channel 72 to surface 77 of dome-plate 55. Propane gas passes from conduit 52 into body portion 53 and through holes 58 where the direct flow streams of propane and the air intermix. The intermixed propane and air then flows to the carburetor 32.

Another novel aspect of the present invention is to reduce the air flow normally attendant to the carburetor intake. It has been found that by placing a screen 80 in front of the outer periphery 81 of replaceable air filter 75, the overall utilization of gasoline and propane is improved. In a further improvement screen 80 is mounted on pivot assembly 82 which is mechanically connected by lever 83 to electro-mechanical switch 84 which, in turn, is electrically connected at 85 to commutator switch 16. Thus in turning switch 16 clockwise and counterclockwise from and to positions 18 and 19, a signal is provided so that screen 80 will be disposed within the air path as at 87 at position 18 and above the air path as at 88, at position 19, so that screen position 87 corresponds with propane switch position 18 and screen position 88 corresponds with gasoline switch position 19. Without wishing to be bound by any theory or mechanism it is believed that this screen operation improves fuel efficiency because the normal gasoline to air ratio is about 1:16 whereas the normal propane to air ratio is about 1:12, although some overall improvement for propane gasoline is shown even with the screen 80 fixedly disposed in position 88.

Referring again to FIG. 1, there is shown the gasoline supply system 90 which comprises gas tank 91, gas pump 92, electromagnetic cut-off valve 93, gasoline feed line 94 and carburetor pre-feed 95, of conventional construction. Valve 93 is interconnected to commutator switch 16 when greater power is required or the propane supply is exhausted. The operator turns switch 16 from position 18 to position 19 so that the propane is shut off as at 15 and screen 80 lifted clear, and valve 93 is opened so as to permit function of the gasoline system in its normal intended manner.

Actuation of all electromechanical elements of the present system is provided by car battery 97 through contact key 98 and fuse 99.

It is to be borne in mind that the present invention is applicable to all internal combustion engines, including diesel engines. In the case of diesel engines, however, the switch over is more direct since both propane and diesel fuel can be co-fed for combustion, whereas with conventional gasoline engines, the carburetor should be somewhat clear of one fuel before full switch over. This is done by holding the switch in position 20 until the motor demand is felt by the operator.

It is also within the contemplation of the present invention to use the propane feed device 30 and the propane feed system 10 as the sole fuel supply system for a vehicle. It was surprisingly found that the propane fuel device and system provides substantially the same horsepower in a high horsepower automobile, as when gasoline operated.

While the described embodiments represent preferred forms of the present invention, it is to be understood that any further modifications will occur to those skilled in the art without departing from the spirit of the present invention. The scope of the present invention is therefore to be determined solely by the appended claims.

What is claimed is:

1. A device for providing propane gas as a secondary fuel to a carburetor of an internal combustion engine utilizing a primary fuel, said device comprising, a body portion being formed with a plurality of outlet holes for the propane, said body portion comprising a cover plate being formed with said outlet holes, said holes being radially disposed from said inlet orifice, said inlet conduit being centrally disposed and extending upwardly from the body portion, and means to mount said body portion downstream of the carburetor air filter intake and upstream of the primary fuel intake, inlet conduit means being formed with an inlet orifice and being mounted on and communicating with said body portion to feed gaseous propane to said body portion and into said holes, said air filter being annular-shaped, and said mounting means comprising a bracket interconnecting said air filter with said body portion so that said inlet conduit is disposed in the center of said air filter, said cover plate being shaped and downwardly disposed so that said outlet holes direct the propane gas outwardly and downwardly from the cover plate, wherein said propane and air admix adjacent said holes so as to provide a propane-air mixture to the carburetor.

2. The device of claim 1, said air filter being annular-shaped, and said mounting means comprising a bracket interconnecting said air filter with said body portion so that said inlet conduit is vertically disposed in the center of said air filter.

3. The device of claim 1, said cover plate being dome-shape and further comprising means interconnecting said cover plate with said inlet conduit.

4. The device of claim 3, further comprising a second cover plate disposed above said first dome-shaped cover plate, said second plate being upwardly disposed and being formed with a plurality of orifices to direct air to said first plurality of holes.

5. The device of claim 4, said second plurality of orifices being of greater size than the orifices of said first plurality.

6. The device of claim 5, said second plurality being of a lesser number than said first plurality.

7. The device of claim 4, said second dome-shaped plate being mounted on the inlet conduit and forming an annular conduit to feed air through the second plate to the first plate.

8. A system for providing propane as a secondary fuel to the carburetor of a gasoline internal combustion engine, said system comprising:
   (a) a liquid propane tank;
   (b) a vaporizer to convert said liquid propane to a gas;
   (c) means to regulate the flow of said propane gas to said carburetor, said means to regulate the flow comprising a control valve and means operatively associated with said control valve connected to the manifold of the engine so that the pressure of the manifold controls the propane gas flow to the carburetor;
   (d) means to mix the propane gas with air at an air filter adjacent the carburetor, and being disposed upstream of the gasoline intake to said carburetor and downstream of the air intake to said air filter, said means to mix the propane gas comprising a body portion being formed with a plurality propane outlet holes, and means to mount said body portion within a carburetor downstream of the air intake and upstream of the gasoline intake, conduit means communicating with said body portion to feed gaseous propane to said body portion, wherein said propane and air admix adjacent said holes so as to provide a propane-air mixture to the carburetor, said body portion comprising a cover plate being formed with said outlet holes, said holes being radially disposed from said inlet orifice, said cover plate being shaped and downwardly disposed so that said outlet holes direct the propane gas outwardly and downwardly from the cover plate; and
   (e) means to control the air intake to the carburetor.

9. The system of claim 8, said cover plate being dome-shape, and further comprising a top plate interconnecting said cover plate with said inlet conduit.

10. The system of claim 9, further comprising a second cover plate disposed above said first dome-shaped cover plate, said second plate being upwardly disposed and comprising a second plurality of orifices to direct air to said first plurality of holes.

11. The system of claim 8, said mean to control the air intake comprising a screen being disposed in said air intake of the carburetor, and means to moveably mount said screen in relation to the gasoline demand.

12. The system of claim 11, said screen being disposed adjacent the carburetor air filter and at the air intake section.

13. A device for providing propane to an internal combustion engine, said device comprising, a body portion being formed with a plurality of outlet holes for the propane, said body portion comprising a cover plate being formed with said outlet holes, said holes being radially disposed from said inlet orifice, and means to mount said body portion downstream of the air intake, inlet conduit means being formed with an inlet orifice and being mounted on and communicating with said body portion to feed gaseous propane to said body portion and into said plurality of holes, said air inlet conduit being centrally disposed and extending upwardly from the body portion, said cover plate being shaped and downwardly disposed so that said outlet holes direct the propane gas outwardly and downwardly from the cover plate, wherein said propane and air admix adjacent said plurality of holes to provide a propane-air gaseous mixture to the engine.

14. The device of claim 13, said air intake comprising an air filter being annular-shaped, and said mounting means comprising a bracket interconnecting said air filter with said body portion so that said inlet conduit is vertically disposed in the center of said air filter.

15. The device of claim 13, said cover plate being dome-shape and further comprising means interconnecting said cover plate with said inlet conduit.

16. The device of claim 15, further comprising a second cover plate disposed above said first dome-shaped cover plate, said second plate being upwardly disposed and being formed with a plurality of orifices to direct air to said first plurality of holes.

17. The device of claim 15, said second plurality of orifices being of greater size than the orifices of said first plurality.

18. The device of claim 17, said second plurality being of a lesser number than said first plurality.

19. The device of claim 13, further comprising means to provide air flow in a annular region on the outside of the said body portion adjacent said plurality of holes.

* * * * *